United States Patent
Ho et al.

(10) Patent No.: US 7,757,014 B2
(45) Date of Patent: Jul. 13, 2010

(54) METHOD FOR DISCONNECTING A TRANSCEIVER FROM A BUS IN MULTIPOINT/MULTIDROP ARCHITECTURE

(76) Inventors: Tsung-Hsien Ho, 3F, No. 34, Ching Ping Rd., Chungho City, Taipei Hsien (TW); Chun-Te Yu, 2F, No.53, Kuang-Jung Street, Shulin City, Taipei Hsien (TW)

(*) Notice: Subject to any disclaimer, the term of this patent is extended or adjusted under 35 U.S.C. 154(b) by 254 days.

(21) Appl. No.: 12/120,242

(22) Filed: May 14, 2008

(65) Prior Publication Data
US 2009/0287852 A1 Nov. 19, 2009

(51) Int. Cl.
*G06F 3/00* (2006.01)
*G06F 13/00* (2006.01)

(52) U.S. Cl. ............... 710/15; 710/32; 710/116; 710/313; 710/316; 714/40; 714/43; 714/44

(58) Field of Classification Search ............... 710/15
See application file for complete search history.

(56) References Cited

U.S. PATENT DOCUMENTS 5,247,522 A * 9/1993 Reiff ............... 714/43

2006/0101171 A1 * 5/2006 Grieff et al. ............... 710/36

* cited by examiner

*Primary Examiner*—Alford W Kindred
*Assistant Examiner*—Brooke J Dews

(57) ABSTRACT

The present invention relates to a method for disconnecting a transceiver from a bus in multipoint/multidrop architecture. A central processing unit (CPU) and a universal asynchronous receiver transmitter (UART) in a system are connected to a controller used for storing and transmitting data, and the controller is further connected with a bus through a transceiver that monitors/records data and a relay that connects or disconnects the transceiver from the bus. The controller comprises a signal comparator used to compare similarities and differences of data and a failure detection controller used to achieve connection or disconnection of the bus with the transceiver. In case of the transceiver's failure, the controller disconnects the transceiver from the bus to ensure that the bus does not fail to work due to breakdown of the transceiver. On the other hand, a signal feedback mechanism is also utilized for a maintenance person to shorten the time in failure detection and thus reduce enterprises' operating losses caused by breakdown of their communication equipments.

7 Claims, 7 Drawing Sheets

METHOD FOR DISCONNECTING A TRANSCEIVER FROM A BUS IN MULTIPOINT/MULTIDROP ARCHITECTURE

BACKGROUND OF THE INVENTION

1. Field of the Invention

The present invention provides a method for disconnecting a transceiver from a bus in multipoint/multidrop architecture by using a controller in which a signal comparator and a failure detection controller are installed for detection and judgment if the transceiver or the bus fails, and by using a relay that enables connection or disconnection between the bus and the transceiver to ensure that the bus and the transceiver work continuously without generating effect on each others.

2. Description of the Related Art

With popularity of Internet and continuous evolution in science and technology, the traditionally labor-intensive enterprises have gradually turned to manufacturing techniques that rely on communication and data transfer between the various equipments instead of a lot of manpower. Installation of highly automatic equipments can not only allow enterprises to reduce their labor costs that are very high, but also contribute to reducing the risks caused by talent flows. With these automatic equipments in place, overall production processes can be implemented mostly by these equipments, where the multipoint/multidrop network architecture technology currently serves as the mechanism of exchange and communication among different equipments.

Generally speaking, in the multipoint architecture, enterprises link all complex communication devices on the bus with the system via a communication interface to ensure interoperability of the complex communication equipments and the system. Under such condition, however, a short circuit or abnormality of any device in the system or bus will lead to communication failure of all complex communication equipments.

Referring to FIG. 5, in the multipoint architecture, there is a system A that includes a central processing unit (CPU) A1 and a universal asynchronous receiver transmitter (UART) A2. The CPU A1 and the UART A2 are linked to a bus C via a transceiver B. In addition, the bus C comprises a plurality of communication equipments C1.

Referring to FIG. 6, when a short circuit occurs in a first device C11 of the communication equipments C1, a plurality of second devices C12 on the bus C will not operate. Moreover in such architecture, it is impossible to learn whether the transceiver B or the first device C11 on the bus C fails. Therefore, a maintenance person must waste more time in deciding whether the failure occurs in the transceiver B or in the first device C11.

Referring to FIG. 7, when the transceiver B is damaged, it will cause the communication equipments C1 on the bus C to be abnormal, thus making the communication equipments C1 unable to intercommunicate successfully. Besides, when the maintenance person arrives, they need to spend much time in re-inspecting to the communication equipments C1, because they are not uncertain whether the failure occurs in the transceiver B or in the communication equipments C1 of the bus C.

Hence, for the firms that utilize machines and equipments as an essential means of production, any failure of the transceiver will immediately lead to disability of the bus, and it also takes them considerable time to examine the devices where the failure occurs. Under such circumstances, the downtime resulting from interaction of these equipments will last for a longer period, which will not only cause losses in tangible costs and profits of these enterprises, but also have impact on their intangible reputation, as they may be unable to deliver goods on schedule to their customers. As a result, these enterprises may find it difficult to continue their cooperation with customers in the future, which in turn will cause great damage to the enterprises themselves.

SUMMARY OF THE INVENTION

The primary objective of the present invention lies in use of a signal comparator installed in a controller to judge if there is a difference between a first data stored in the controller and a second data monitored/recorded by the transceiver. If the difference exists between the first data and the second data, a signal will be transmitted from a failure detection controller of the controller to a relay to disconnect the transceiver from a bus. Such means of isolation can prevent the transceiver from impacting operation of other machines and equipments on the bus, even if the transceiver itself fails.

The secondary objective of the present invention is to provide a solution for a maintenance person to learn where the failure occurs. When the relay is disconnected and the signal comparator in the controller once again judges that the first data stored in the controller is different from another second data monitored/recorded by the transceiver, a signal will be transmitted from the controller to CPU in the system for enabling the maintenance person to be sure that the failure occurs in the transceiver. On the other hand, if it is judged that these data are the same, a failure interrupt signal will still be transmitted from the controller to the CPU in the system to facilitate the maintenance person to determine which device on the bus fails. This will enable the maintenance person to shorten time in identifying failures, thus reducing operating losses of enterprises caused by equipment breakdown.

DETAILED DESCRIPTION OF THE PREFERRED EMBODIMENT

Figure 1:
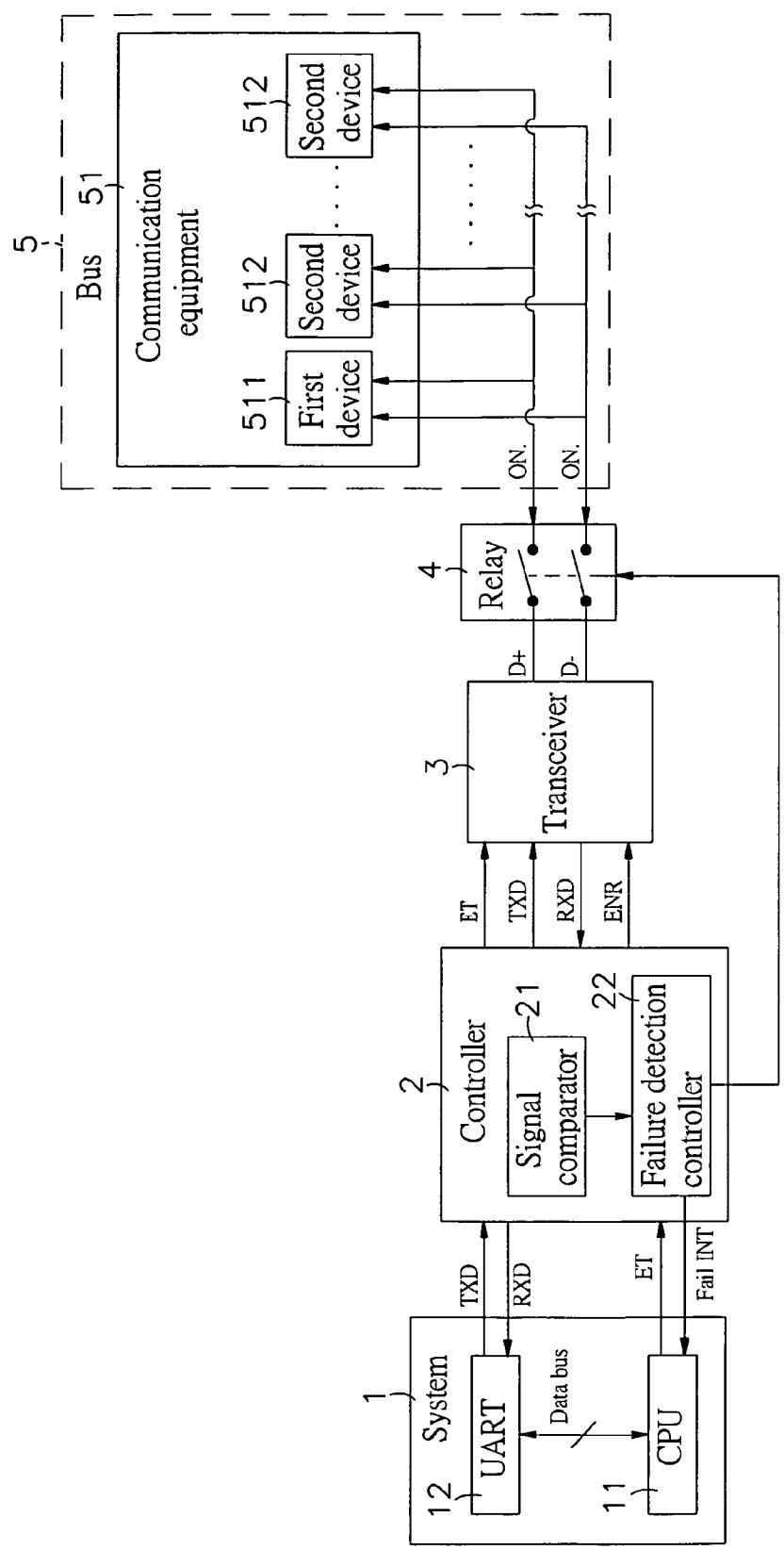
FIG. 1 is a schematic drawing illustrating the disconnection of a transceiver from a bus according to the preferred embodiment of the present invention.
Figure 2:
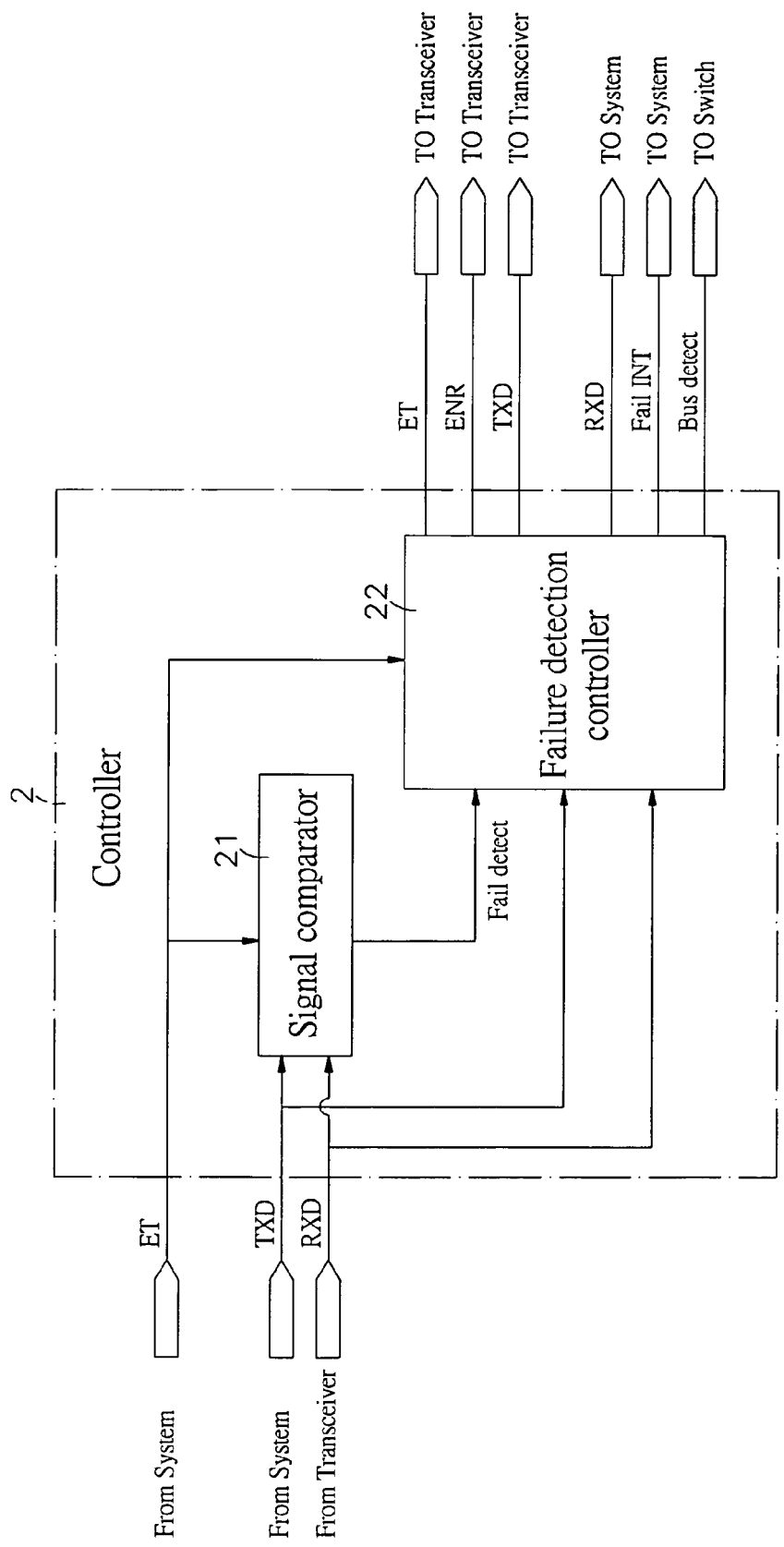
FIG. 2 is a block diagram of a controller in accordance with the present invention.

Referring to FIGS. 1 and 2, the present invention is shown comprising a system 1, a controller 2, a transceiver 3, a relay 4 and a bus 5.

The system 1 comprises a central processing unit (CPU) 11 and a universal asynchronous receiver-transmitter (UART) 12, and the CPU 11 and the URAT 12 are connected with the controller 2. The controller 2 comprises a signal comparator 21 and a failure detection controller 22. In addition, the controller 2 is linked with the transceiver 3, and the transceiver 3 is further connected with a plurality of communication equipments 51 on the bus 5 via the relay 4. The equipments 51 comprise a first device 511 and a plurality of second devices 512.

Figure 3:
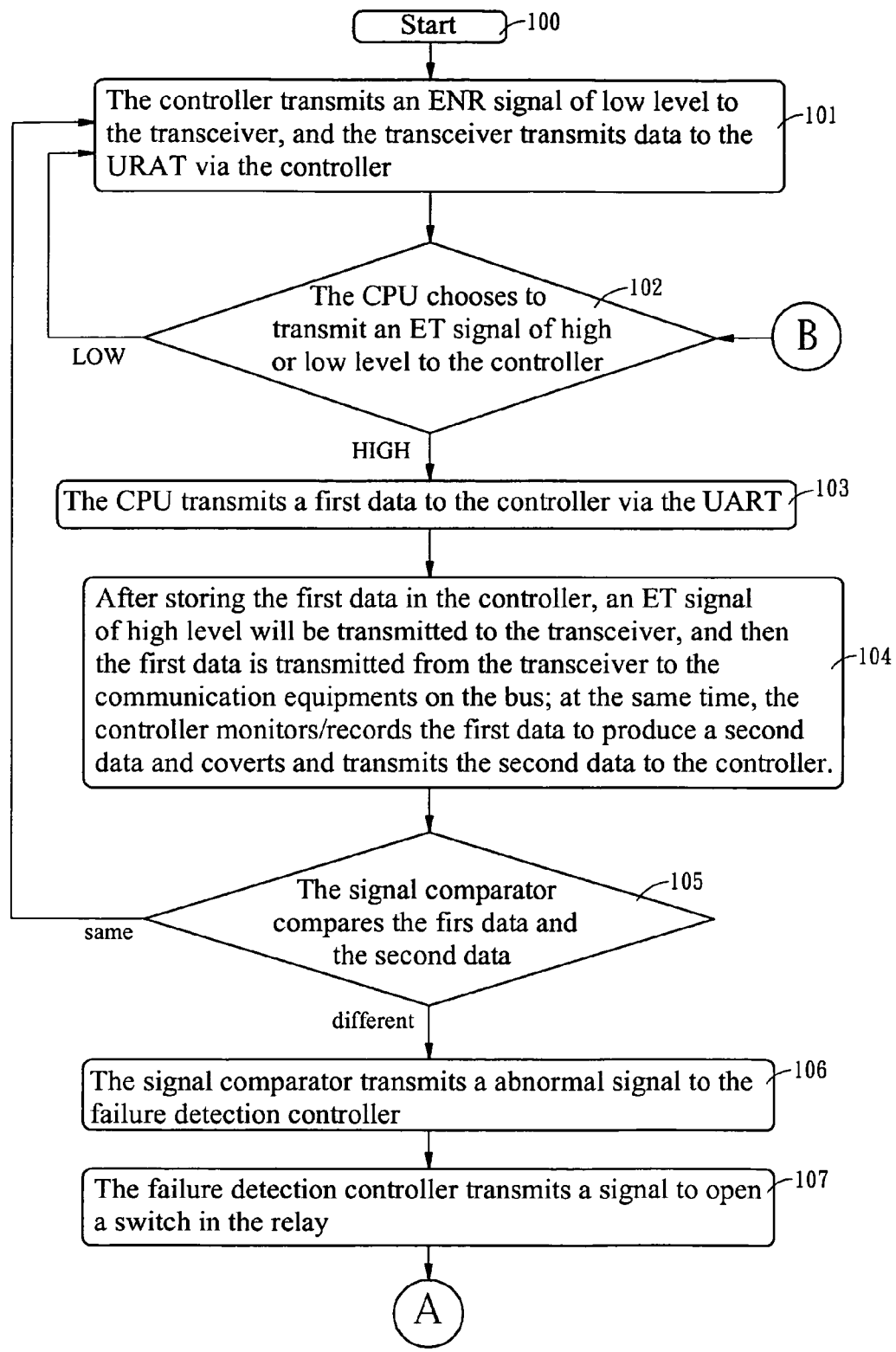
FIG. 3 is a flow chart of disconnecting the transceiver from the bus in accordance with the present invention (I).
Figure 4:
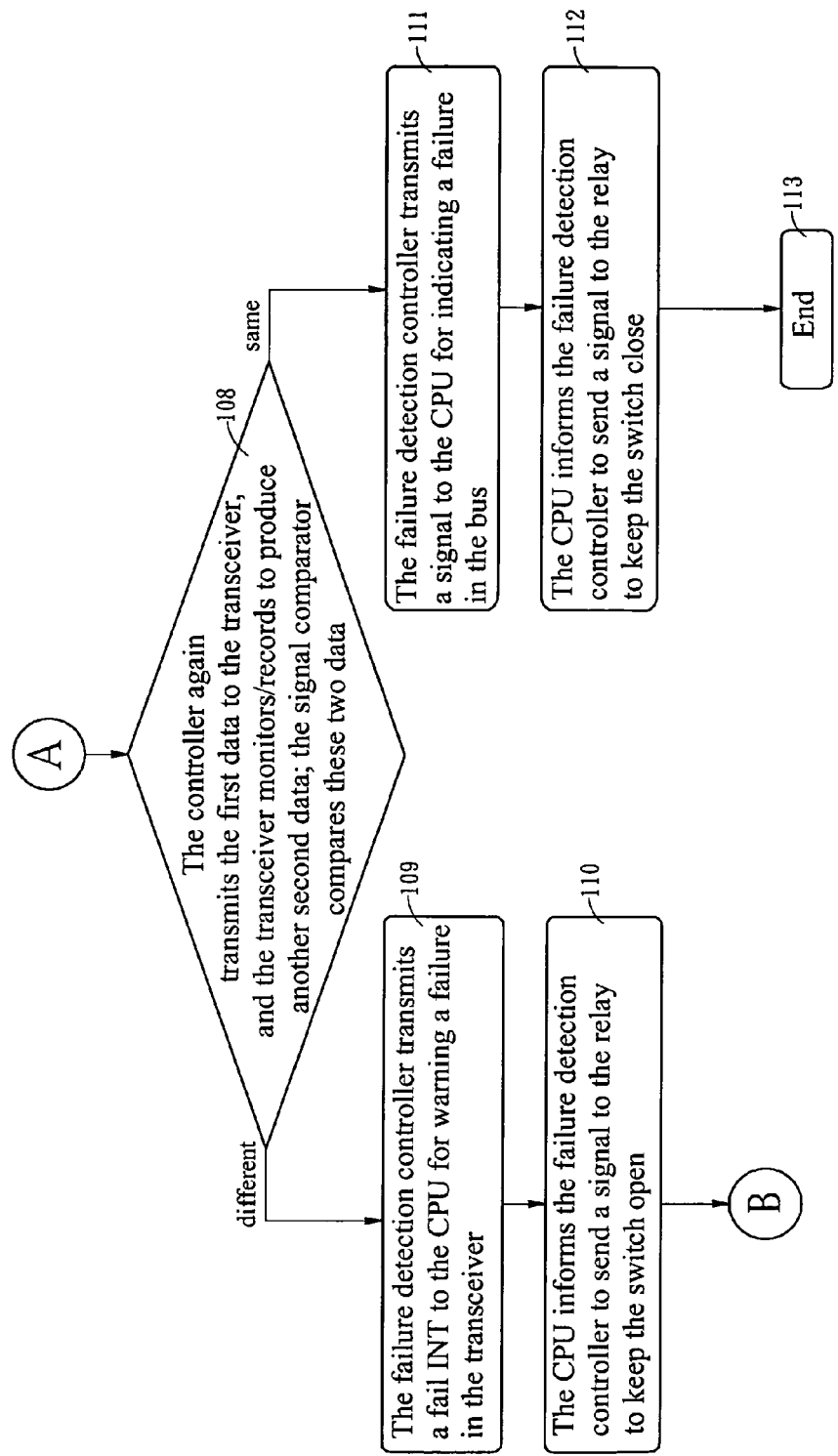
FIG. 4 is a flow chart of disconnecting the transceiver from the bus in accordance with the present invention (II).
Figure 5:
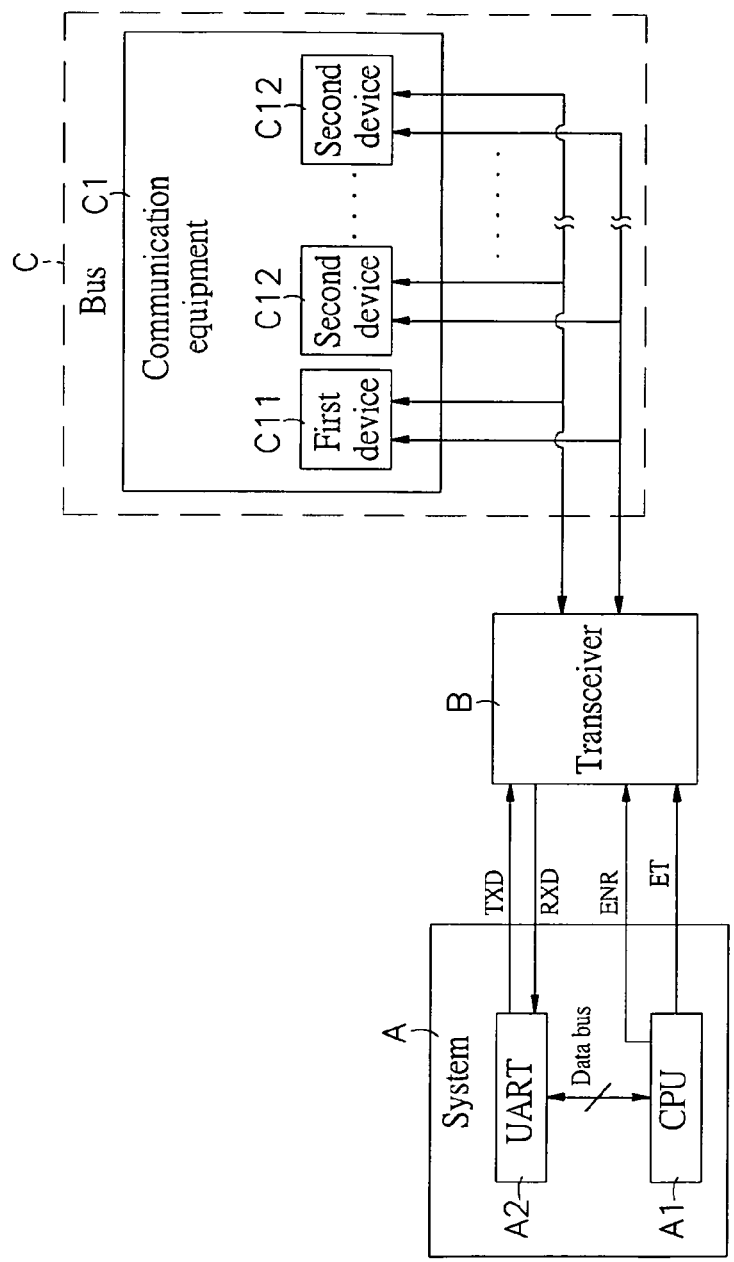
FIG. 5 is a schematic drawing illustrating the architecture of a transceiver and a bus according to the prior art.
Figure 6:
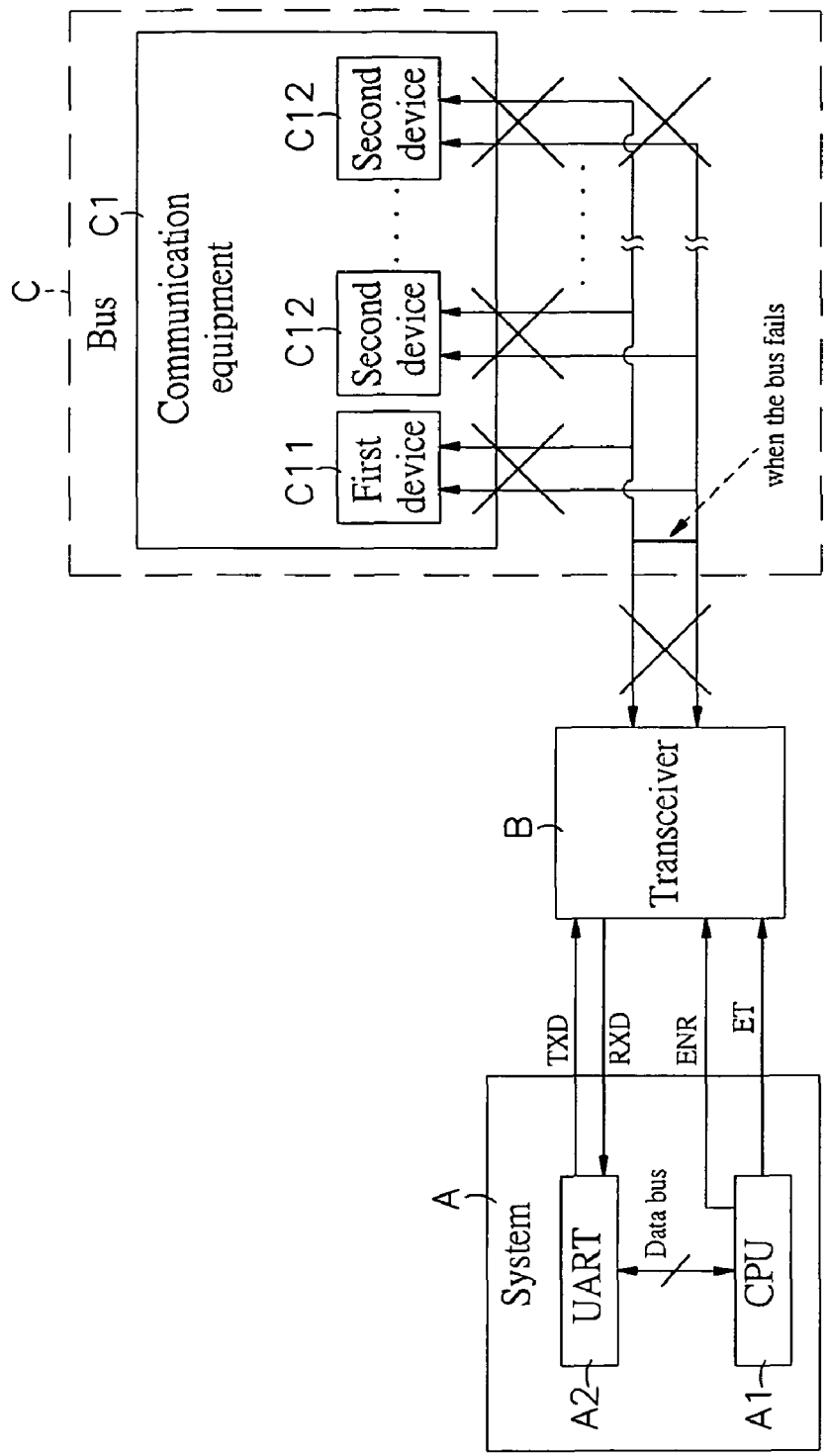
FIG. 6 is a schematic drawing illustrating the bus under short circuit condition according to the prior art.
Figure 7:
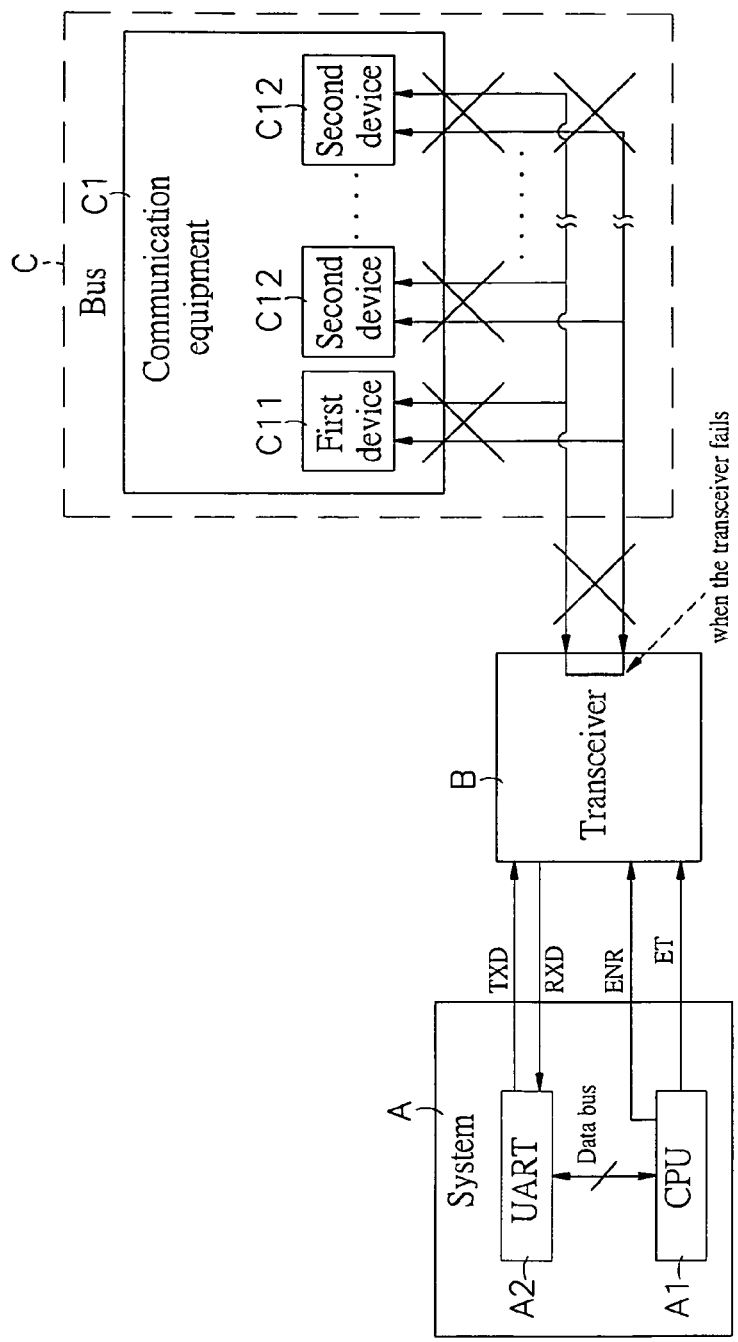
FIG. 7 is a schematic drawing illustrating the transceiver's failure resulting in a short circuit of the bus according to the prior art.

Referring to FIGS. 3 and 4, the disconnection of the transceiver 3 from the bus 5 operates subject to the following steps:

100 Start.

101 The controller 2 continuously transmits an enable negative receiver (ENR) signal of low level to the transceiver 3, and then the transceiver 3 transmits continuously data to the UART 12 through the controller 2.

102 The CPU 11 of the system 1 chooses to transmit an enable transmitter (ET) signal of high or low level to the controller 2. If the ET signal level is low, it indicates that there is no need to make comparison of the data, and then carry out the step 101; if the ET signal level is high, it indicates that a comparison of the data must be made, and then carry out the step 103.

103 The CPU transmits a first data to the controller 2 via the UART 12.

104 After the first data is stored in the controller 2, an ET signal of high level will be transmitted from the controller 2 to the transceiver 3, so that the first data is transmitted from the transceiver 3 to the communication equipments 51 on the bus 5. In the meantime, the transceiver 3 monitors/records the transmission of the first data from the controller 2 to the bus 5 to produce a second data, converts the second data into the format identifiable to the controller 2, and then transmits it to the controller 2.

105 The signal comparator 21 of the controller 2 compares the first data stored in the controller 2 with the second data monitored/recorded in the transceiver 3. If these data are decided to be the same, carry out the step 101; if not so, carry out the step 106.

106 The signal comparator 21 transmits a signal indicating an abnormal condition to the failure detection controller 22.

107 The failure detection controller 22 transmits a signal to open a switch in the relay 4.

108 The controller 2 again transmits the first data to the transceiver 3, and the transceiver 3 monitors/records the transmission of the first data from the controller 2 to the transceiver 3 to produce another second data and feeds it back to the controller 2. The signal comparator 21 then compares the first data stored in the controller 2 with another second data fed back from the transceiver 3. If there is a difference between the two data, carry out the step 109; if not, carry out the step 111.

109 The failure detection controller 22 transmits a fail INT to the CPU 11 in the system 1, warning that there is a failure in the transceiver 3.

110 The CPU 11 informs the failure detection controller 22 of the controller 2 to send a signal to the relay 4 to keep the switch open, and then implement the step 102.

111 The failure detection controller 22 transmits a signal to the CPU 11 in the system 1, indicating there is a failure in the bus 5.

112 The CPU 11 informs the failure detection controller 22 in the controller 2 to send a signal to the relay 4 to enable the switch to be closed.

113 End.

It can be learnt from the above-mentioned steps that the controller 2 transmits an ENR signal of low level continuously to the transceiver 3, so that data can be fed back from the transceiver 3 to the UART 12 uninterruptedly. While the CPU 11 transmits an ET signal of high level to the controller 2, it means that the action of judging if the data is right or wrong must be performed. At this time, the CPU 11 transmits a first data to the controller 2 via the UART 12. After having stored the first data, the controller 2 again transmits an ET signal of high level to the transceiver 3 so as to make the first data be further transmitted from the transceiver 3 to the bus 5. Meanwhile, the transmission of the first data is monitored/recorded by the transceiver 3 and created as a second data. Further, the signal comparator 21 in the controller 2 is used to decide whether the first and second data are the same, and the failure detection controller 22 in the controller is used to enable connection or disconnection between the transceiver 3 and the bus 5 by judgment. If there is a difference between the first and the second data after comparison, it shows that there is failure, and the signal comparator 21 will transmit a signal to the failure detection controller 22 in the controller 2, which further transmits a signal to make the switch of the relay 4 be kept open. When the switch of the relay 4 is open, the signal comparator 21 of the controller 2 further judges whether the first data stored in the controller 2 and another second data fed back from the transceiver 3 are the same. If the two data are the same, the switch of the relay 4 will be closed; otherwise the relay 4 will be kept open. Afterwards, a failure signal will be transmitted to a maintenance person in order to quickly learn whether the failure occurs in the communication equipments 51 of the bus 5 or in the transceiver 3 itself.

Hence, this method can be used to judge the reasons for failure, which may lie in a short circuit of the transceiver 3 or of the communication equipments 51 on the bus 5. At the same time, the abnormality of the system 1 will be informed, and the maintenance person only need to inspect and repair the communication equipments 51 on the bus 5 or the transceiver 3 without the need to examine both the communication equipments 51 and the transceiver 3 for maintenance purpose. This will help to shorten time for maintenance work greatly and reduce the downtime caused by failures in machines and equipments, thus allowing enterprises to reduce their operating risks.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A method for disconnecting a transceiver from a bus in multipoint/multidrop architecture, comprising a system which has a central processing unit (CPU) and a universal asynchronous receiver transmitter (UART), a controller, a transceiver, a relay and a bus, wherein said CPU and said UART are connected to said transceiver via said controller, and said transceiver is further connected with a plurality of communication equipments on said bus through said relay, and wherein said controller is equipped with a signal comparator used to compare similarities and differences of data and a failure detection controller used to decide connection or disconnection of said bus with said transceiver, the method comprising the steps of:

(a) said CPU transmits a first data to said controller via said UART;

(b) after said first data is stored in said controller, said controller transmits an enable transmitter (ET) signal of high level to said transceiver so that said first data is transmitted via said transceiver to said plurality of communication equipments on said bus, at the same time, said transceiver monitors/records the transmission of said first data from said controller to said bus and generates a second data, converts said second data into the format identifiable to said controller and then transmits back to said controller;

(c) said signal comparator in said controller compares said first data stored in said controller with said second data monitored/recorded by said transceiver;

(d) when it is decided that there is a difference between said first data and said second data, said signal comparator transmits a signal indicating an abnormal condition to said failure detection controller; and (e) said failure detection controller transmits a signal enabling a switch in said relay to be opened.

2. The method for disconnecting the transceiver from the bus in multipoint/multidrop architecture according to claim 1, wherein said controller continuously transmits an enable negative receiver (ENR) signal of low level to said transceiver, which uninterruptedly transmits data to said UART via said controller.

3. The method for disconnecting the transceiver from the bus in multipoint/multidrop architecture according to claim 1, wherein said CPU transmits said first data via said UART to said controller while transmitting an enable transmitter (ET) signal of high level from said CPU to said controller.

4. The method for disconnecting the transceiver from the bus in multipoint/multidrop architecture according to claim 3, wherein said first data is not transmitted via said UART to said controller while said CPU transmits said ET signal of low level to said controller.

5. The method for disconnecting the transceiver from the bus in multipoint/multidrop architecture according to claim 1, wherein said signal comparator in said controller compares said first data stored in said controller with said second data monitored/recorded by said transceiver and there is no difference is found, it implies that no failure occurs in said transceiver or said communication equipments on said bus.

6. The method for disconnecting the transceiver from the bus in multipoint/multidrop architecture according to claim 1, wherein said controller again transmits said first data to said transceiver when said transceiver and said bus are disconnected, and said transceiver monitors/records the transmission of said first data from said controller to said transceiver to generate another second data and feeds back to said controller, if said signal comparator decides that said first data stored in said controller is different from said another second data fed back from said transceiver, said failure detection controller transmits a signal to said CPU for indicating a failure in said transceiver and keeping said transceiver and said bus disconnected.

7. The method for disconnecting the transceiver from the bus in multipoint/multidrop architecture according to claim 6, wherein if said failure detection controller transmits a signal to said CPU for indicating a failure in said communication equipments on said bus and enabling the connection between said transceiver and said bus to be restored when said signal comparator judges that said first data stored in said controller is the same with said another second data fed back from said transceiver.

* * * * *